United States Patent [19]

Given, Jr. et al.

[11] Patent Number: 4,888,187
[45] Date of Patent: Dec. 19, 1989

[54] FRUIT-CONTAINING CONFECTIONERY BAR

[75] Inventors: Peter S. Given, Jr., Verona; Henry Arciszewski, Franklin Lakes, both of N.J.

[73] Assignee: Nabisco Brands, Inc., East Hanover, N.J.

[21] Appl. No.: 215,496

[22] Filed: Jul. 6, 1988

[51] Int. Cl.⁴ ............................................. A23G 3/00
[52] U.S. Cl. .................... 426/102; 426/103; 426/306; 426/659; 426/660
[58] Field of Search ............... 426/102, 103, 282, 284, 426/306, 660, 297, 307, 273, 274, 659

[56] References Cited

U.S. PATENT DOCUMENTS

| | | | |
|---|---|---|---|
| 1,076,751 | 10/1913 | Davidson | 426/102 |
| 1,204,880 | 11/1916 | Kern. | |
| 1,518,737 | 12/1924 | Griffith | 426/282 |
| 1,686,786 | 10/1926 | Zeller. | |
| 2,594,538 | 4/1952 | Brabaek | 99/134 |
| 2,682,471 | 6/1954 | Alther | 426/103 |
| 2,946,689 | 7/1960 | Pekal | 426/102 |
| 3,315,619 | 4/1967 | Slaybaugh | 107/69 |
| 3,554,766 | 1/1971 | Engel | 99/134 |
| 3,705,814 | 12/1972 | Rahman | 426/102 |
| 3,892,870 | 7/1975 | Wood | 426/573 |
| 3,953,615 | 4/1976 | Gupia et al.. | |
| 3,955,003 | 5/1976 | Loos et al. | 426/132 |
| 4,117,172 | 9/1978 | Bradshaw et al. | 426/276 |
| 4,117,176 | 9/1978 | Taylor et al. | 426/660 |
| 4,205,093 | 5/1980 | Blake | 426/333 |
| 4,232,053 | 11/1980 | Blake | 426/616 |
| 4,256,772 | 3/1981 | Shanbhag et al. | 426/331 |
| 4,289,790 | 9/1981 | Bruelle | 426/306 |
| 4,307,126 | 12/1981 | Sano et al. | 426/660 |
| 4,355,050 | 10/1982 | Butland | 426/615 |
| 4,362,757 | 12/1982 | Chen et al. | 426/599 |
| 4,410,552 | 10/1983 | Gaffney et al. | 426/103 |
| 4,491,597 | 1/1985 | Varvil et al. | 426/103 |
| 4,542,033 | 9/1985 | Agarwala | 426/321 |
| 4,563,358 | 1/1986 | Mercer et al. | 426/89 |
| 4,567,055 | 1/1986 | Moore | 426/578 |
| 4,654,222 | 3/1987 | Fuller, Jr. | 426/640 |
| 4,784,867 | 11/1988 | La Baw et al. | 426/660 |

FOREIGN PATENT DOCUMENTS

| | | | |
|---|---|---|---|
| 924411 | 6/1909 | Australia. | |
| 245557 | 6/1963 | Australia | 426/660 |
| 2453200 | 5/1976 | Fed. Rep. of Germany. | |
| 484855 | 12/1975 | U.S.S.R. | 426/660 |
| 827010 | 5/1981 | U.S.S.R. | 426/103 |
| 2177589 | 1/1987 | United Kingdom. | |

OTHER PUBLICATIONS

Bender 1960 Dictionary of Nutrition and Food Technology, Academic Press, New York, pp. 25 and 125.
Morgan 1982 Chocolate and Candy Cookbook, Arco Publishing Inc., N.Y., pp. 135-138.

*Primary Examiner*—Carolyn Paden
*Attorney, Agent, or Firm*—Richard Kornutik

[57] ABSTRACT

A confectionary bar is disclosed that contains a natural fruit center which is encapsulated in a layer of caramel. This caramel layer has an embedded layer of nuts. This combination of a natural fruit center encapsulated in caramel having embedded nuts is then enrobed in a compound coating, usually a chocolate-flavored compound coating. The confectionery bar should have a water activity level of less than about 0.50 at 25° C. The natural fruit portion of the confectionery bar should have a water activity level of less than 0.65 at 25° C.

15 Claims, No Drawings

FRUIT-CONTAINING CONFECTIONERY BAR

BACKGROUND OF THE INVENTION

This invention relates to a fruit-containing confectionery candy product. More particularly, this invention relates to a candy bar product which contains a fruit center.

There is a continuing trend in the food product area to, as much as possible, incorporate natural components into food items. This is in response to the growing popularity of items such as granola bars, natural fruit bars and natural fruit roll-ups. These products maximize the use of natural food components and are considered to be nutritious and beneficial when taken as snacks. It is a present objective to produce a confectionery bar product which contains as the primary ingredients a natural fruit section and a nut section. The natural fruit section is present as a dried fruit substance which can range in consistency from a stiff gel material to a fruit leather material. The fruit section consists of a puree of one or more fruits which is dried to a water activity level of less than about 0.6 at 25° C. The nut section will consist of nuts or pieces of nuts such as peanuts, cashews, almonds, walnuts, pistachios and mixtures of these nuts. It is necessary to have a composite water activity level for the final confectionery bar of less than about 0.50 at 25° C. A water activity of level of less than about 0.50 at 25° C. is necessary in order for the confectionery bar to have an effective shelf life. If the water activity level is above about 0.50 at 25° C., other components of the confectionery bar will tend to take up some of the water and either be spoiled, lose flavor or lose desirable texture as in the cast of nut meats.

In a particular embodiment the present invention is directed to a confectionery candy bar product which has a fruit center which is encapsulated in a layer of caramel which in turn has a nut coating. Overlaying the nut coating is a compound coating, usually a chocolate flavored compound coating. In this product, the center fruit portion and the nut layer that is embedded in the caramel are the natural food materials that are incorporated into the bar. The caramel layer provides sweetening for the other components of the confectionery bar. The chocolate flavored compound coating enhances the flavor the confectionery bar as well as providing visual appeal. The compound coating also functions to cover the tacky caramel layer and thus make the confectionery bar easier to handle while it is being consumed.

It is known to make dried fruit products which are essentially natural products. U.S. Pat. No. 4,654,222 discloses a process for making a dried fruit product which consists of peeling or coring fruit as necessary and then making a puree of the fruit. The fruit peels, in a comminuted state, can be added to the puree. This puree is then dried using a drum dryer to produce a product which has a final moisture content of less than about 1 percent.

U.S. Pat. No. 4,542,033 discloses processes for preparing shelf-stable fruit pieces. The process consists of the steps of providing fresh fruit pieces, deactivating or retarding enzymatic browning, cooking in an acidified sugar syrup, sulfiding and dehydrating. The fruit pieces are soft in texture and have preferred water activity levels of about 0.5 to 0.7. The fruit pieces are not incorporated into a confectionery bar.

U.S. Pat. No. 4,410,552 discloses a confectionery item having an outer coating which is chocolate, an intermediate layer and a core. The core is a smooth textured material which has a nut, coffee, vanilla or other flavoring. The intermediate layer is a light, aerated fat material having less flavor than the core. This product does not contain any fruit components.

U.S. Pat. No. 4,355,050 discloses a process for producing a natural fruit candy by mixing enzyme deactivated and dehydrated fruit with enzyme deactivated fruit juice concentrate to provide a mixture in the form of a plastic mass having a moisture content of up to 50 percent by weight. This dehydrated plastic mass is then formed into fruit candy products. These candy products do not contain nuts.

U.S. Pat. No. 4,307,126 discloses a method for producing a fruit-containing chocolate. The fruit is either a dried or a candied fruit. In this product the dried or candied fruits are incorporated directly into the chocolate. That is, the chocolate contains and is flavored by a fruit.

U.S. Pat. No. 4,289,790 discloses a storage stable confection which does not require moisture resistant packaging. This is prepared by coating a crunchy core of cereal, dried fruits or nuts with alternate layers of chocolate and gasified candy. The core of the candy is either cereal, dried fruit, nuts or mixtures of these materials. This core is then caramelized by coating with a concentrated liquid sugar solution. Alternate layers of chocolate and gasified candy overlay this central core.

U.S. Pat. No. 4,256,772 discloses dried fruits that can be incorporated into a dry cereal. The dried fruits and cereal can be remain in contact for long periods of time without the water migrating from the dried fruits to the cereal grains. It is an object in this patent to have the water activity of the fruit to not differ by more than 0.35 from the water activity level of the cereal.

U.S. Pat. No. 4,232,053 discloses food products in the form of a comestible base which contains major amounts of citrus juice and residual juice solids. Moisture is removed from the mixture during a cooking step during which the viscosity of the mixture increases considerably. These fruit preparations can be formulated into jams or into gel-like desserts.

U.S. Pat. No. 4,205,093 discloses a food product which contains orange citrus juice vesicle solids. This fruit product has a moisture content of from about 8 percent to about 30 percent. This low moisture content combination of citrus juice vesicle solids can be formed into an orange fruit leather product.

U.S. Pat. No. 4,117,176 discloses a candy product with a fruit flavor which is characterized by a chewy character, a taffy-like consistency, and slipperiness sufficient to avoid adhering to a person's teeth. This candy product is a corn syrup-based translucent substrate having opaque dehydrated fruit particles randomly dispersed in this substrate.

U.S. Pat. No. 4,117,172 discloses a fruit product which has a texture which is sensed on eating as being non-uniform. The texture is similar to that of soft-centered fruits such as gooseberries and cherries. This is prepared by a process in which fruit pulp or puree is admixed with alginate or pectate sol and brought into contact with dissolved calcium ion. This gels the sol and the fruit pulp or puree is distributed between a fluid or plastic core of the aglinate or pectate sol. The product is heated in a final step to prevent the core from becoming a firm gel. The intent here is to produce a simulated soft-centered fruit product.

U.S. Pat. No. 3,554,766 discloses fruit-flavored hard candy comprising a hard candy matrix containing particles of freeze-dried fruit. The particles have been partially reconstituted and have a preserving and protective layer of sugar or corn syrup. In a preferred embodiment, the candy also contains natural or synthetic fruit flavors which correspond to the freeze-dried fruit which is contained in the candy.

U.S. Pat. No. 1,686,786 discloses a dried fruit product which optionally can have a chocolate coating. In this process the dried fruit is reduced to flakes and then the flakes compacted together to form a sheet or a slab of the dried fruit. After being cut into pieces, the dried fruit can be consumed or coated with chocolate.

Australian Patent No. 924,411 discloses a fruit and nut mixture product which consists of slabs, blocks or rods which consist of a plastic mass of one or more dried fruits and one or more nut components. The nuts are in a crushed or milled state. The final product is formed by compression in a mold or by extrusion. In this product, the nut and fruit components are thoroughly intermixed.

Besides the various confectionery products which are disclosed and discussed in these patents, there are other confectionery products which are currently in the marketplace. One of these is the confectionery bar sold under the name Baby Ruth. It has a water activity level in the range of about 0.43. This confectionery bar has a nougat center which is overlayed by a layer of caramel. The caramel contains a layer of nuts which is then overcoated with a chocolate layer. This product consists of a nougat center rather than a natural fruit center. As a result, this confectionery product is not considered to be as nutritious as a product which contains a natural fruit center.

BRIEF SUMMARY OF THE INVENTION

The present invention comprises a confectionery bar product which has a natural fruit center. Overlaying the natural fruit center is an encapsulating layer of caramel. This layer of caramel carries an embedded nut layer with the entire composite then being enrobed in a compound coating such as a chocolate-flavored compound coating. The overall product has a water activity level of less than about 0.50 at 25° C. The natural fruit center has a water activity level of less than about 0.65 at 25° C.

This confectionery bar product is produced either by extruding the fruit core center or by taking dried sheets of fruit material, also known as fruit leather, and rolling these sheets of fruit material into a cylindrical or related shape. The water activity level of the fruit is reduced to less than about 0.65 at 25° C. if it is above this level. Usually the water activity level will be reduced to less than 0.65 at 25° C. prior to the fruit section being formed into a shape. This fruit core is then encapsulated in a caramel coating. Nuts are then embedded into the caramel coating and the full confectionery item coated with a compound coating, which is usually a chocolate-flavored compound coating. The resulting product is a confectionery bar containing a natural fruit center and a layer of nuts. The fruit and the nuts provide two contrasting tastes, while the caramel and chocolate components provide a smoothness and a sweetening of the confectionery bar. The fruit and nut components being natural items will make this snack product more nutritious.

DETAILED DESCRIPTION OF THE INVENTION

In more detail, the present fruit-centered confectionery bar comprises a fruit center which is primarily composed of natural fruit substances. This fruit center is nutritious and provides the consumer with a source of vitamin C as well as other vitamins and minerals. The fruit center is preferably cylindrical or nearly cylindrical in shape. This fruit center is encapsulated in a layer of caramel. Embedded in the caramel coating is a layer of nuts. The nuts are likewise nutritious and provide a source of protein. The caramel layer with the embedded nuts is then coated with a flavored coating. The flavored compound coating is preferably a chocolate coating or a chocolateflavored coating.

In order for this candy bar to have an effective shelf life and to maintain its appealing appearance, it is necessary that the water activity level of the confectionery bar be less than about 0.50 at 25° C. The fruit section of the bar should have a water activity level of less than about 0.50 at 25° C. If the water activity level of the finished confectionery bar is too high, water will migrate into the nuts and into the chocolate coating. At an increased water level the nuts will have a shortened shelf life. The chocolate coating is not significantly harmed by slight increases in the water content and, in fact, resists water adsorption. However, as the water content increases, the appearance of the chocolate coating can change, giving the impression that the candy bar is stale. Consequently, it is an objective to produce a fruit-centered candy bar wherein the moisture content of the fruit is such that little, if any, will migrate into the other components of the confectionery bar.

The water activity level of a confectionery bar is, in essence, the relative humidity of the confectionery bar at 25° C. That is, the water activity level of the confectionery bar is the equilibrium humidity of the bar when it is stored in a confined area at 25° C. The water activity level of a candy bar, or of components of a candy bar, can be determined by using an instrument manufactured by Beckman Instruments, Inc. known as the Hygroline Flat-Bed Recorder Model VFB. The equilibrium relative humidity is measured on discrete samples inserted into a sample chamber equipped with a humidity sensor. The chamber is sealed and the recorder of the unit gives a printout of the water activity (Aw) of the sample. An equilibrium water activity level is reached when the recorder has a liner output. The chamber in which the sample is sealed during analysis is maintained at 25° C. The instrument is calibrated using standard saturated salt solutions.

The center fruit section of the confectionery bar is composed of dried fruit materials. However, even though these are dried fruit materials, they still have a high water content. Fresh fruits have a water content of 95 percent by weight or more. A fruit puree from which the fruit centers for the confectionery bars are produced will have a water activity level approaching 1. As this puree is dried, the water activity level decreases. This puree will appear to be very dry at a water activity level in the range of 0.6 to 0.75 at 25° C. This is the case even though there remains a fairly high water content. It is for this reason that when a fruit-centered confectionery bar is to be produced that the water activity level becomes an important factor. The fruit part of the confectionary bar should have a firm consistency but should not be dried to such a level that it is difficult to bite into and through the confectionery bar. Therefore, the fruit center portion cannot be dried down to very low water activity levels, such as water activity levels of less than about 30. Essentially any fruit can be used for the fruit center of the confectionery bar. The fruits that can be used include apple, apricot, blackberry, black currant, blueberry, cherry, cranberry, date, elderberry, fig, grape, grapefruit, guava, lemon, lime, mango, orange, papaya, passion fruit, peach, pear, pineapple, plum, prune, red currant, raspberry, and strawberry. Mixtures of these fruits can also be used. The fruit is prepared by removing the skin, if the particular fruit has a skin, and forming the fruit into a puree. Fruits such as apples, that have cores, and peaches, which have pits, would be decored and depitted prior to being formed into a puree. The fruit puree is then preferably heated to a temperature to kill any bacteria that may be present and to deactivate any enzymes. This is preferably accomplished by heating the puree to about 180° to 200° F. for a period of at least 10 to 60 seconds. The puree is then dried to a water activity level of less than about 0.65 and formed into a shape for subsequent manufacture of the confectionery bar. The shaping of the fruit can be by means of extrusion to the final shape that is to be used, or the puree can be dried in the form of sheets of the dried fruit and these sheets then rolled to provide the cylindrical or other shape for this part of the confectionery bar. If produced in the form of sheets, sheets of different fruits can be combined in layers to produce a fruit center having a mixed fruit taste. For instance, there could be a fruit cocktail type of center wherein there are layers of a number of different fruits. After the formation of the fruit center, this fruit center is then encapsulated in a caramel layer. The caramel layer preferably includes high fructose corn syrup which has the effect of increasing the bond of the subsequently applied nuts to the caramel layer. It also decreases the viscosity of the caramel layer while not significantly raising the water activity level. Otherwise, essentially any caramel product can be used. A useful caramel is one that is produced commercially under the brand name Kraft Caramel. This caramel layer will be from about 0.2 centimeters to about 1.5 centimeters in thickness. The caramel layer will constitute up to about 40 percent of the bar. The caramel layer is then overlayed with a layer of nuts. The nuts are preferably in the form of nut fragments of a particle size of about 1 to 15 millimeters in diameter. The nuts than can be used include peanuts, cashews, almonds, walnuts, and pistachio nuts. Other nuts can be used in order to impart a particular taste. Also, combinations of these nuts can be used.

As noted above, it has been found that the viscosity of the caramel can be controlled through the addition of a high fructose corn syrup solution. This solution will contain about 80 to 95 weight percent of high fructose corn syrup. This solution is added to the caramel in an amount of about 2 to 25 weight percent of the caramel. This high fructose corn syrup decreases the viscosity of the caramel solution but does not significantly increase the water activity level.

The nut layer can be applied by a technique whereby the caramel-coated fruit is rolled in a pan containing the nuts. The nuts are then picked up by the caramel surface. Overlaying the nut layer is a coating layer. This coating layer is preferably a chocolate coating or a chocolate-flavored coating. This outer chocolate-flavored compound coating layer is applied in order to enhance the overall appearance of the confectionery bar and also to make the confectionery bar easier to handle. This compound coating covers the tacky caramel layer and makes the candy easier to handle while eating. After the chocolate-flavored compound layer has been applied, the confectionery bar is cooled so as to solidify the chocolate layer. Each bar weighs between about 29 and 33 grams. However, bars can readily be made in smaller or larger sizes.

The fruit puree, and the resulting dried product can be produced using essentially any known technique. The objectives are that the fruit portion should be, to a high degree, a natural fruit material, and should be stable. That is, the fruit will have to undergo a pasteurization and an enzyme deactivation prior to being dried and incorporated into the confectionery bar. In addition, the fruit portion can contain some additives such as vitamins, minerals, thickening agents such as guar gum or xanthan gum, corn syrup, soy bean oil, citric acid and mono- and di-glycerides. Other additives can also be a part of the center fruit portion. However, it is the objective to, as much as possible, use only natural substances when producing the fruit center. It is also the objective to minimize the amounts of non-natural components.

Confectionery bars produced in accordance with the present discovery have been found to have a superior shelf life. Confectionery bars were heat sealed in aluminum foil pouches and stored for a period of a year at room temperature. There was no rancidity or off-flavor with regard to any of the components of the confectionery bar. In addition, the nuts retained their flavor and the texture of the confectionery bar was retained over this period of time.

The present confectionery product will be further described with reference to the following Examples.

EXAMPLE 1

In this example two confectionery bars are produced using an apricot fruit leather as the fruit core. The apricot fruit leather is a commercially available material from Flavor Tree Foods. The caramel is a Kraft brand caramel to which is added 10% of a 90% high fructose corn syrup. The nuts are peanuts which have been reduced to a size of about 0.25 to 0.5 the origial size of the peanuts. The coating is a chocolate-flavored compound similar to that used on other commercially available confectionery bars such as the Baby Ruth bar.

The following tables provide the data on the components of the confectionery bars:

TABLE 1

| | Bar No. 1 | | |
|---|---|---|---|
| Component | Grams | % | Aw ~25° C.[1] |
| Fruit Core | 11.4 | 27.7 | 0.58 |
| Peanuts | 5.9 | 14.4 | 0.36 |
| Caramel | 15.4 | 37.5 | 0.275 |
| Coating | 8.4 | 20.4 | 0.303 |

TABLE 2

| | Bar No. 2 | | |
|---|---|---|---|
| Component | Grams | % | Aw ~25° C.[1] |
| Fruit Core | 11.4 | 31.6 | 0.58 |
| Peanuts | 5.6 | 15.5 | 0.36 |
| Caramel | 12.7 | 35.2 | 0.275 |

TABLE 2-continued

| | Bar No. 2 | | |
|---|---|---|---|
| Component | Grams | % | Aw ~25° C.[1] |
| Coating | 6.4 | 17.7 | 0.303 |

[1] Aw is the water activity level which is determined using a Hygroline Flat-Bed Recorder Model VFB available from Beckman Instruments, Inc.

The apricot fruit leather in each case was rolled into a tight core having a linear dimension of about 6 to 7.5 centimeters. This core of fruit leather is then coated with a layer of caramel maintained at about 95° C. The thickness of the caramel layer is nominally about 0.6 to 1.0 centimeters. The caramel-coated fruit core is then rolled in a bed of the above nuts whereby the soft caramel layer takes up the nut pieces. The nut layer is then enrobed in a chocolate-flavored compound by flowing a curtain of the chocolate-flavored compound over the bar. The bar is then cooled to set the chocolate-flavored compound coating and packaged.

The water activity level of Bar No. 1 is 0.414 and that of Bar No. 2 is 0.477. Each of these bars exhibited good shelf life in storage testing.

EXAMPLE 2

This example consists of Table 3 which sets out Aw levels of various fruit ingredients.

TABLE 3

| Ingredient | Aw 25° C. |
|---|---|
| Sweet Orange Marmalade | 0.842 |
| Sun-Dried Apricots | 0.833 |
| Raspberry Fruit Roll[2] | 0.520 |
| Cherry Fruit Roll[2] | 0.462 |
| Dates | 0.720 |
| Raisin Paste | 0.579 |
| Caramels[3] | 0.498 |
| Peanuts[4] | 0.155 |
| Chocolate-flavored Compound | 0.29 |

[2] Available from Flavor Tree Foods
[3] Kraft brand caramel
[4] Planter's brand roasted and salted peanuts The water activity levels were determined as in Example 1. In order for the above fruits to be used they must have a water activity level of less than about 0.65. Consequently, the sweet orange marmalade, sun-dried apricots and dates require further drying prior to any use to make a confectionery bar.

EXAMPLE 3

This example illustrates the advantage of using high fructose corn syrup as a diluent for the caramel. The water activity of fresh melted caramel heated to 95° C. is 0.499. However, as this caramel is maintained at this temperature during usage, the viscosity increases. In order to reduce the viscosity, 20% by weight of a 90% high fructose corn syrup is added to the caramel. This caramel mixture was used to make a confectionery bar as in Example 1 except that a raspberry fruit leather was used as the fruit core. The confectionery bar had a water activity level of 0.377. In addition, the nut layer adhered more strongly to this caramel coating.

What is claimed is:

1. A fruit-containing confectionery product that has a water activity level of less than about 0.50 comprising a high solids content fruit core having a water activity level of less than about 0.65; said fruit core being encapsulated in a barrier caramel layer having a water activity level of less than about 0.50; nuts being embedded in said barrier caramel layer, and the foregoing being enrobed in a coating which covers said nuts and caramel.

2. A fruit-containing confectionery product as in claim 1 wherein said high solids fruit is a dried fruit material selected from the group consisting of fig, blueberry, raspberry, red currant, strawberry, blackberry, black currant, grape, apricot, cherry, cranberry, date, elderberry, apple, pineapple, pear, mango, papaya, guava, peach, orange, passion fruit, lime, grapefruit lemon, plum, prune and mixtures thereof.

3. A fruit-containing confectionery product as in claim 2 wherein said embedded nuts are selected from the group consisting of peanuts, cashews, almonds, pistachios, walnuts and mixtures thereof.

4. A fruit-containing confectionery product as in claim 1 wherein said embedded nuts are selected from the group consisting of peanuts, cashews, almonds, walnuts, pistachios and mixtures hereof.

5. A fruit-containing confectionery product as in claim 3 wherein the enrobing coating is a chocolate-flavored coating.

6. A fruit-containing confectionery product as in claim 1 wherein the enrobing coating is a chocolate-flavored coating.

7. A fruit-containing confectionery product as in claim 5 wherein said barrier caramel layer contains high fructose corn syrup.

8. A fruit-containing confectionery product as in claim 1, wherein said barrier caramel layer contains high fructose corn syrup.

9. A method for preparing a fruit-containing confectionery product that has a water activity level of less than about 0.50 comprising:
   (a) forming a fruit puree;
   (b) drying said fruit puree to a water activity level of less than about 0.65;
   (c) shaping the dried fruit puree into an elongated shape;
   (d) encapsulating said elongated shape in a caramel;
   (e) embedding nuts into said caramel; and
   (f) enrobing the combination of the caramel encapsulated dried fruit with embedded nuts with a chocolate-flavored coating.

10. A method for preparing a fruit-containing confectionery product as in claim 9 wherein said dried fruit puree is shaped by extruding.

11. A method for preparing a fruit-containing confectionery product as in claim 9 wherein said dried fruit puree is in the form of sheets that are rolled to form an elongated shape.

12. A method for preparing a fruit-containing confectionery product as in claim 11 wherein said sheets of dried fruit consist of sheets of more than one fruit.

13. A method for preparing a fruit-containing confectionery product as in claim 9 wherein said fruit puree is selected from the fruits consisting of lemon, fig, blueberry, cranberry, raspberry, red currant, strawberry, blackberry, black currant, apricot, apple, pear, cherry, date, elderberry, peach, pineapple, orange, mango, papaya, guava, lime, grapefruit, plum, prune, passion fruit and mixtures thereof.

14. A method for preparing a fruit-containing confectionery product as in claim 9 wherein said nuts are selected from the group consisting of peanuts, cashews, pistachios, almonds, walnuts and mixtures thereof.

15. A method for preparing a fruit-containing confectionery product as in claim 9 wherein said caramel contains high fructose corn syrup.

* * * * *